US012603200B2

(12) United States Patent
Iwasaki et al.

(10) Patent No.: US 12,603,200 B2
(45) Date of Patent: *Apr. 14, 2026

(54) RARE EARTH SINTERED MAGNET, METHOD FOR PRODUCING RARE EARTH SINTERED MAGNET, ROTOR, AND ROTARY MACHINE

(71) Applicant: Mitsubishi Electric Corporation, Tokyo (JP)

(72) Inventors: Akito Iwasaki, Tokyo (JP); Yukina Yoshioka, Tokyo (JP); Yoshikazu Nakano, Tokyo (JP); Yasutaka Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 770 days.

This patent is subject to a terminal disclaimer.

(21) Appl. No.: 17/798,308

(22) PCT Filed: Apr. 8, 2020

(86) PCT No.: PCT/JP2020/015876
§ 371 (c)(1),
(2) Date: Aug. 9, 2022

(87) PCT Pub. No.: WO2021/205580
PCT Pub. Date: Oct. 14, 2021

(65) Prior Publication Data
US 2023/0079836 A1      Mar. 16, 2023

(51) Int. Cl.
*H01F 1/057* (2006.01)
*B22F 3/16* (2006.01)
(Continued)

(52) U.S. Cl.
CPC .............. *H01F 1/0577* (2013.01); *B22F 3/16* (2013.01); *B22F 3/24* (2013.01); *B22F 9/04* (2013.01);
(Continued)

(58) Field of Classification Search
CPC .............. C22C 2202/02; C22C 38/005; B22F 2003/248; B22F 2301/355; B22F 3/16;
(Continued)

(56) References Cited

U.S. PATENT DOCUMENTS

| | | | |
|---|---|---|---|
| 7,048,808 | B2 | 5/2006 | Kaneko et al. |
| 2002/0062884 | A1 | 5/2002 | Kaneko et al. |

(Continued)

FOREIGN PATENT DOCUMENTS

| | | | | |
|---|---|---|---|---|
| CN | 1347123 | A | 5/2002 | |
| CN | 101238530 | A * | 8/2008 | ............ B22F 1/0044 |

(Continued)

OTHER PUBLICATIONS

NPL: on-line translation of CN-101238530-A, Aug. 2008. (Year: 2008).*

(Continued)

*Primary Examiner* — Jie Yang
(74) *Attorney, Agent, or Firm* — XSENSUS LLP

(57) ABSTRACT

A rare earth sintered magnet according to the present disclosure includes: a main phase satisfying general formula (Nd, La, Sm)—Fe—B and including crystal grains based on $R_2Fe_{14}B$ crystal structures; and a crystalline subphase based on an oxide phase represented by (Nd, La, Sm)—O. The subphase has a higher concentration of Sm than the main phase.

10 Claims, 9 Drawing Sheets

Nd f
Nd g
Fe c
Fe e
Fe j₁
Fe j₂
Fe k₁
Fe k₂
B g

(51) Int. Cl.

| | |
|---|---|
| *B22F 3/24* | (2006.01) |
| *B22F 9/04* | (2006.01) |
| *C22C 38/00* | (2006.01) |
| *H01F 41/02* | (2006.01) |
| *H02K 1/02* | (2006.01) |
| *H02K 1/16* | (2006.01) |
| *H02K 1/27* | (2022.01) |

(52) U.S. Cl.
CPC ....... *C22C 38/005* (2013.01); *H01F 41/0266* (2013.01); *H02K 1/02* (2013.01); *H02K 1/16* (2013.01); *H02K 1/27* (2013.01); *B22F 2003/248* (2013.01); *B22F 2301/355* (2013.01); *C22C 2202/02* (2013.01)

(58) Field of Classification Search
CPC .. B22F 3/24; B22F 9/04; H01F 1/0577; H01F 41/0266

See application file for complete search history.

(56) References Cited

U.S. PATENT DOCUMENTS

| | | | |
|---|---|---|---|
| 2021/0043343 A1* | 2/2021 | Takeda ................... | C22C 38/005 |
| 2021/0242727 A1 | 8/2021 | Kajita et al. | |
| 2022/0336126 A1 | 10/2022 | Iwasaki et al. | |
| 2023/0377783 A1 | 11/2023 | Iwasaki et al. | |

FOREIGN PATENT DOCUMENTS

| | | | |
|---|---|---|---|
| CN | 109585112 A | 4/2019 | |
| DE | 60119864 T2 | 9/2006 | |
| JP | 2002-190404 A | 7/2002 | |
| JP | 2018-160669 A | 10/2018 | |
| JP | 6692506 B1 | 5/2020 | |
| WO | 2019/111328 A1 | 6/2019 | |
| WO | 2019/230457 A1 | 12/2019 | |

OTHER PUBLICATIONS

International Search Report and Written Opinion mailed on Jun. 30, 2020, received for PCT Application PCT/JP2020/015876, filed on Apr. 8, 2020, 9 pages including English Translation.

Office Action issued Mar. 24, 2023 in a corresponding Chinese patent application No. 202080099374.7 and English translation thereof, 21 pages.

Indian Office Action issued Feb. 17, 2023, in corresponding Indian Patent Application No. 202227052995, 5pp.

German Office Action with an English translation issued Oct. 31, 2024, in German Application No. 11 2020 007 065.4, 19pp.

Notice of Reasons for Refusal mailed Jun. 6, 2023, in the corresponding Japanese Application No. 2022-045423, 5 pages.

* cited by examiner

Nd f

Nd g

Fe c

Fe e

Fe $j_1$

Fe $j_2$

Fe $k_1$

Fe $k_2$

B g

METHOD FOR PRODUCING RARE EARTH MAGNET ALLOY START

S1

MELTING STEP

S2

PRIMARY COOLING STEP

S3

SECONDARY COOLING STEP

END

FIG.5

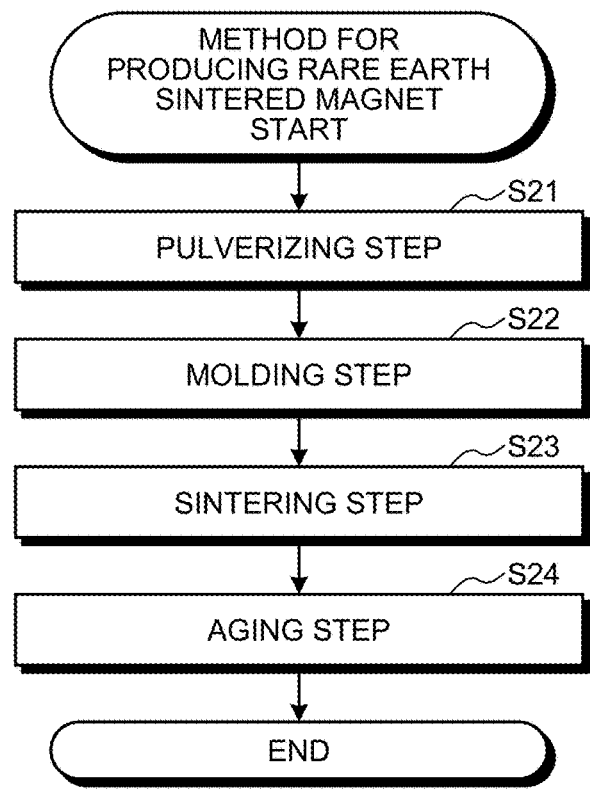

```
        ┌─────────────────────────┐
        │  METHOD FOR             │
        │  PRODUCING RARE EARTH   │
        │  SINTERED MAGNET        │
        │  START                  │
        └─────────────────────────┘
                    │
                    ▼               S21
        ┌─────────────────────────┐
        │   PULVERIZING STEP      │
        └─────────────────────────┘
                    │
                    ▼               S22
        ┌─────────────────────────┐
        │   MOLDING STEP          │
        └─────────────────────────┘
                    │
                    ▼               S23
        ┌─────────────────────────┐
        │   SINTERING STEP        │
        └─────────────────────────┘
                    │
                    ▼               S24
        ┌─────────────────────────┐
        │   AGING STEP            │
        └─────────────────────────┘
                    │
                    ▼
        ┌─────────────────────────┐
        │         END             │
        └─────────────────────────┘
```

FIG.6

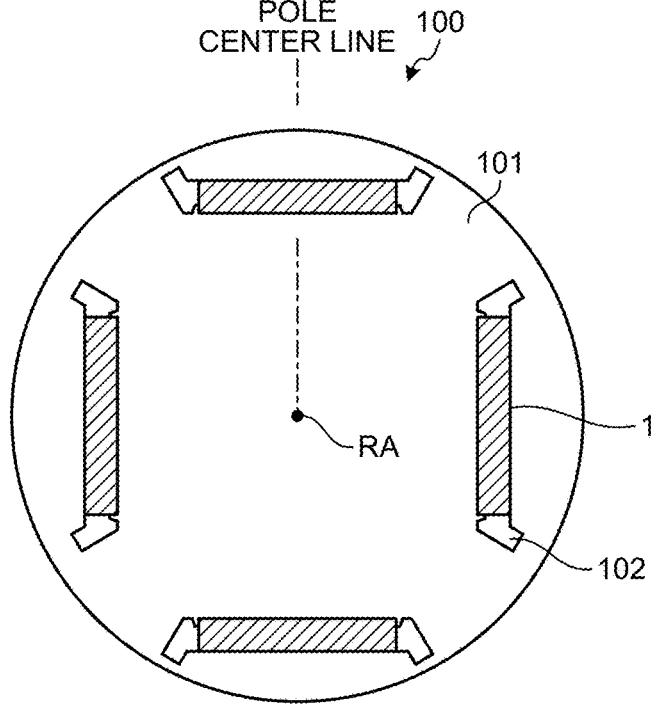

| CP | Level |
|---|---|
| | 2812 |
| | 2420 |
| | 2028 |
| | 1636 |
| | 1244 |
| | 2066 |

| Nd | Level |
|---|---|
| | 783 |
| | 638 |
| | 472 |
| | 314 |
| | 156 |
| | 278 |

| Fe | Level |
|---|---|
| | 631 |
| | 477 |
| | 324 |
| | 170 |
| | 17 |
| | 448 |

| B | Level |
|---|---|
| | 15 |
| | 11 |
| | 7 |
| | 3 |
| | 0 |
| | 3 |

RARE EARTH SINTERED MAGNET, METHOD FOR PRODUCING RARE EARTH SINTERED MAGNET, ROTOR, AND ROTARY MACHINE

CROSS-REFERENCE TO RELATED APPLICATION

The present application is based on PCT filing PCT/JP2020/015876, filed Apr. 8, 2020, the entire contents of which are incorporated herein by reference.

FIELD

The present disclosure relates to a rare earth sintered magnet which is a permanent magnet obtained by sintering a material containing a rare earth element, a method for producing a rare earth sintered magnet, a rotor, and a rotary machine.

BACKGROUND

Known R-T-B-based permanent magnets have a tetragonal $R_2T_{14}B$ intermetallic compound as a main phase. R is a rare earth element, T is a transition metal element such as Fe (iron) or Fe having its portion replaced with cobalt (Co), and B is boron. R-T-B-based permanent magnets are used for various high value-added components including industrial motors. In particular, Nd—Fe—B-based sintered magnets where R is neodymium (Nd) have excellent magnetic properties, and are thus used for various components. In addition, because industrial motors are often used in a high temperature environment exceeding 100° C., attempts have been made to improve coercive force and heat resistance by adding heavy rare earth elements such as dysprosium (Dy) to Nd-T-B-based permanent magnets.

In recent years, the production of Nd—Fe—B-based sintered magnets has been expanded, and the consumption of Nd and Dy has been increased. Unfortunately, Nd and Dy are expensive and also have a procurement risk due to high distribution unevenness. In view of this, a possible measure for reducing the consumption of Nd and Dy is to use other rare earth elements as R, such as cerium (Ce), lanthanum (La), samarium (Sm), scandium (Sc), gadolinium (Gd), yttrium (Y), and lutetium (Lu). With these elements substituted for all or a part of Nd, unfortunately, magnetic properties are known to be significantly degraded. In the case of using these elements for producing Nd—Fe—B-based sintered magnets, therefore, attempts have been conventionally made to develop technology that allows for preventing the magnetic properties from degrading with temperature rise.

Patent Literature 1 discloses a permanent magnet having a tetragonal $R_2Fe_{14}B$ crystal structure and having the composition formula $(Nd_{1-x-y}La_xSm_y)_2Fe_{14}B$, in which x is in the range of 0.01 to 0.16 and y is in the range of 0.01 to 0.16. According to Patent Literature 1, the addition of La and Sm in the above composition range to the Nd—Fe—B-based permanent magnet prevents the magnetic properties from degrading with temperature rise.

Patent Literature 2 discloses a rare earth sintered magnet expressed by the composition formula $(R1_x+R2_y)T_{100-x-y-z}Q_z$ and including crystal grains having $Nd_2Fe_{14}B$-type crystal structures as main phases, in which x is in the range of 8 at % to 18 at %, y is in the range of 0.1 at % to 3.5 at %, z is in the range of 3 at % to 20 at %, and at least a part of the grain boundary phase has a higher concentration of R2 than the main phase crystal grains. R1 is at least one element selected from the group consisting of all rare earth elements except La, Y, and Sc, and R2 is at least one element selected from the group consisting of La, Y, and Sc. T is at least one element selected from the group consisting of all transition elements, and Q is at least one element selected from the group consisting of B and carbon (C). According to Patent Literature 2, diffusion of elements such as Y throughout the grain boundary phase allows rare earth elements essential for the main phase such as Nd and Pr to be efficiently used without being consumed in the grain boundary phase. As a result, it is possible to provide a rare earth sintered magnet which maintains high magnetization of the main phase and exhibits excellent magnetic properties.

CITATION LIST

Patent Literature

Patent Literature 1: PCT Patent Application Laid-open No. 2019/111328
Patent Literature 2: Japanese Patent Application Laid-open No. 2002-190404

SUMMARY

Technical Problem

The permanent magnet described in Patent Literature 1 does not have a crystalline subphase, and there is a high possibility that La and Sm added to $Nd_2Fe_{14}B$ are uniformly dispersed in the permanent magnet. For this reason, the concentration of Nd in the main phase can be relatively lower than that of a normal $Nd_2Fe_{14}B$ magnet, resulting in deterioration of magnetic properties at room temperature. For the rare earth sintered magnet described in Patent Literature 2, there is a possibility that magnetic properties are significantly degraded as the temperature rises. In order for the rare earth sintered magnet described in Patent Literature 2 to maintain high coercive force, in addition, an element contributing to improvement of magnetic properties such as Co and nickel (Ni) needs to be added. Furthermore, if Ce is added in the rare earth sintered magnet described in Patent Literature 2, Ce exists substantially uniformly in the sintered magnet, and the magnetization monotonically decreases as the amount of Ce added increases. Thus, the rare earth sintered magnet described in Patent Literature 2 has room for improvement in terms of magnetic properties. For this reason, there has been a demand for permanent magnets capable of maintaining magnetic properties at room temperature equivalent to those of Nd—Fe—B-based sintered magnets as well as preventing the magnetic properties from degrading with temperature rise.

The present disclosure has been made in view of the above, and an object thereof is to obtain a rare earth sintered magnet capable of maintaining the magnetic properties at room temperature equivalent to those of Nd—Fe—B-based sintered magnets as well as preventing the magnetic properties from degrading with temperature rise, reducing the use of Nd and Dy.

Solution to Problem

To solve the above problem and achieve the object, the present disclosure provides a rare earth sintered magnet comprising: a main phase satisfying general formula (Nd, La, Sm)—Fe—B and including a crystal grain based on an $R_2Fe_{14}B$ crystal structure; and a crystalline subphase based on an oxide phase represented by (Nd, La, Sm)—O. The subphase has a higher concentration of Sm than the main phase.

Advantageous Effects of Invention

The present disclosure can achieve the effect of maintaining magnetic properties at room temperature equivalent to those of Nd—Fe—B-based sintered magnets as well as preventing magnetic properties from degrading with temperature rise, reducing the use of Nd and Dy.

BRIEF DESCRIPTION OF DRAWINGS

FIG. 5 is a flowchart illustrating an exemplary procedure of a method for producing a rare earth sintered magnet according to the second embodiment.

FIG. 6 is a cross-sectional view schematically illustrating an exemplary configuration of a rotor equipped with a rare earth sintered magnet according to a third embodiment.

DESCRIPTION OF EMBODIMENTS

A rare earth sintered magnet, a method for producing a rare earth sintered magnet, a rotor, and a rotary machine according to embodiments of the present disclosure will be hereinafter described in detail with reference to the drawings.

First Embodiment

Figure 1:
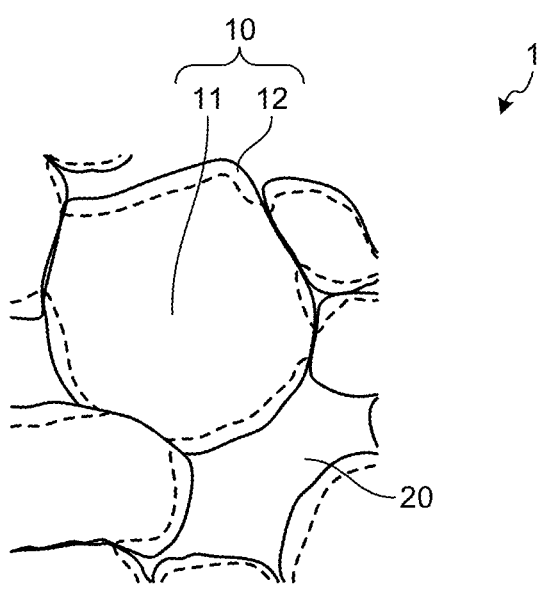
FIG. 1 is a diagram schematically illustrating an exemplary sintered structure of a rare earth sintered magnet according to a first embodiment.

FIG. 1 is a diagram schematically illustrating an exemplary sintered structure of a rare earth sintered magnet according to the first embodiment. The permanent magnet according to the first embodiment is a rare earth sintered magnet 1 including a main phase 10 and a crystalline subphase 20. The main phase 10, which satisfies general formula (Nd, La, Sm)—Fe—B, is a crystal grain based on a tetragonal $R_2Fe_{14}B$ crystal structure. The subphase 20 is based on an oxide phase represented by (Nd, La, Sm)—O.

The main phase 10 has a tetragonal $R_2Fe_{14}B$ crystal structure where R is Nd, La, and Sm. That is, the main phase 10 has the composition formula $(Nd, La, Sm)_2Fe_{14}B$. The result of calculation of magnetic interaction energy using a molecular orbital method shows that a composition having La and Sm added to Nd forms a practical rare earth sintered magnet 1. This the reason why R of the rare earth sintered magnet 1 having a tetragonal $R_2Fe_{14}B$ crystal structure is rare earth elements consisting of Nd, La, and Sm. Note that adding too much La and Sm causes a decrease in the amount of Nd that is an element having a high magnetic anisotropy constant and a high saturation magnetic polarization. As a result, the magnetic properties will degrade. For this reason, the composition ratio of Nd, La, and Sm is preferably Nd>(La+Sm).

The average grain size of the crystal grain of the main phase 10 is preferably 100 μm or less. As illustrated in FIG. 1, the crystal grain of the main phase 10 include a core portion 11 and a shell portion 12 provided on the outer periphery of the core portion 11. The shell portion 12 may cover a part of the outer periphery of the core portion 11. In one example, the shell portion 12 is provided in a region in contact with the subphase 20.

In the first embodiment, the concentration of Nd in the shell portion 12 is equal to or higher than the concentration of Nd in the core portion 11. The concentration of Nd in the shell portion 12 is desirably in the range of one to five times the concentration of Nd in the core portion 11. Nd in the core portion 11 is low in concentration and is partly replaced by La and Sm, thereby making it possible to reduce the material cost as compared with general $Nd_2Fe_{14}B$ magnets. In addition, since the shell portion 12 having a higher Nd concentration than the core portion 11 is provided at the peripheral edge of the crystal grains, it is possible to improve magnetic anisotropy and prevent magnetization reversal. As described above, the crystal grains of the main phase 10 having a core-shell structure make it possible to prevent degradation of magnetic properties as well as reducing use of Nd.

The crystalline subphase 20 is present between the main phases 10. As described above, the crystalline subphase 20 is represented by (Nd, La, Sm)—O, where (Nd, La, Sm) means that a part of Nd is replaced by La and Sm.

In the rare earth sintered magnet 1 according to the first embodiment, La is segregated in the subphase 20 and coats at least a part of the surface of the main phase 10. Sm is dispersed in the main phase 10 and the subphase 20 with a difference in concentration of Sm between the main phase 10 and the subphase 20. Specifically, the concentration of Sm in the subphase 20 is higher than the concentration of Sm in the main phase 10. The relational expression $1<Y_2/Y_1<X_2/X_1$ is satisfied, where $X_1$ represents the concentration of La contained in the main phase 10, $X_2$ represents the concentration of La contained in the subphase 20, $Y_1$ represents the concentration of Sm contained in the main phase 10, and $Y_2$ represents the concentration of Sm contained in the subphase 20. La is segregated in the grain boundary in the process of production, particularly in the heat treatment, whereby Nd is relatively diffused throughout the main phase 10. As a result, the rare earth sintered magnet 1 according to the first embodiment provides an improved magnetization as Nd in the main phase 10 is not consumed at the grain boundary. Sm, which is present at a higher concentration in the subphase 20 than in the main phase 10, allows Nd to relatively diffuse throughout the main phase 10 as with La, resulting in the improved magnetization. Furthermore, Sm, which also exists in the crystal grains of the main phase 10, is coupled with Fe, a ferromagnetic substance in the same magnetization direction to thereby contribute to improvement of the residual magnetic flux density. The structure, which has La segregated in the subphase 20 and Sm present at a higher concentration in the subphase 20 than in the main phase 10, includes the main phase 10 with core-shell structure having different Nd concentrations.

The rare earth sintered magnet 1 according to the first embodiment may contain an additive element M that improves magnetic properties. The additive element M is one or more elements selected from the group consisting of aluminum (Al), copper (Cu), Co, zirconium (Zr), titanium (Ti), gallium (Ga), praseodymium (Pr), niobium (Nb), Dy, terbium (Tb), manganese (Mn), Gd, and holmium (Ho).

The rare earth sintered magnet 1 according to the first embodiment is therefore expressed by general formula ($Nd_a$-$La_bSm_c$)$Fe_dB_eMf$, where M is one or more elements selected from the group consisting of Al, Cu, Co, Zr, Ti, Ga, Pr, Nb, Dy, Tb, Mn, Gd, and Ho. It is desirable that a, b, c, d, e, and f satisfy the following relational expressions.

$$5 \leq a \leq 20$$

$$0 < b + c < a$$

$$70 \leq d \leq 90$$

$$0.5 \leq e \leq 10$$

$$0 \leq f \leq 5$$

$$a + b + c + d + e = 100 \text{ atom \%}$$

Figure 2:
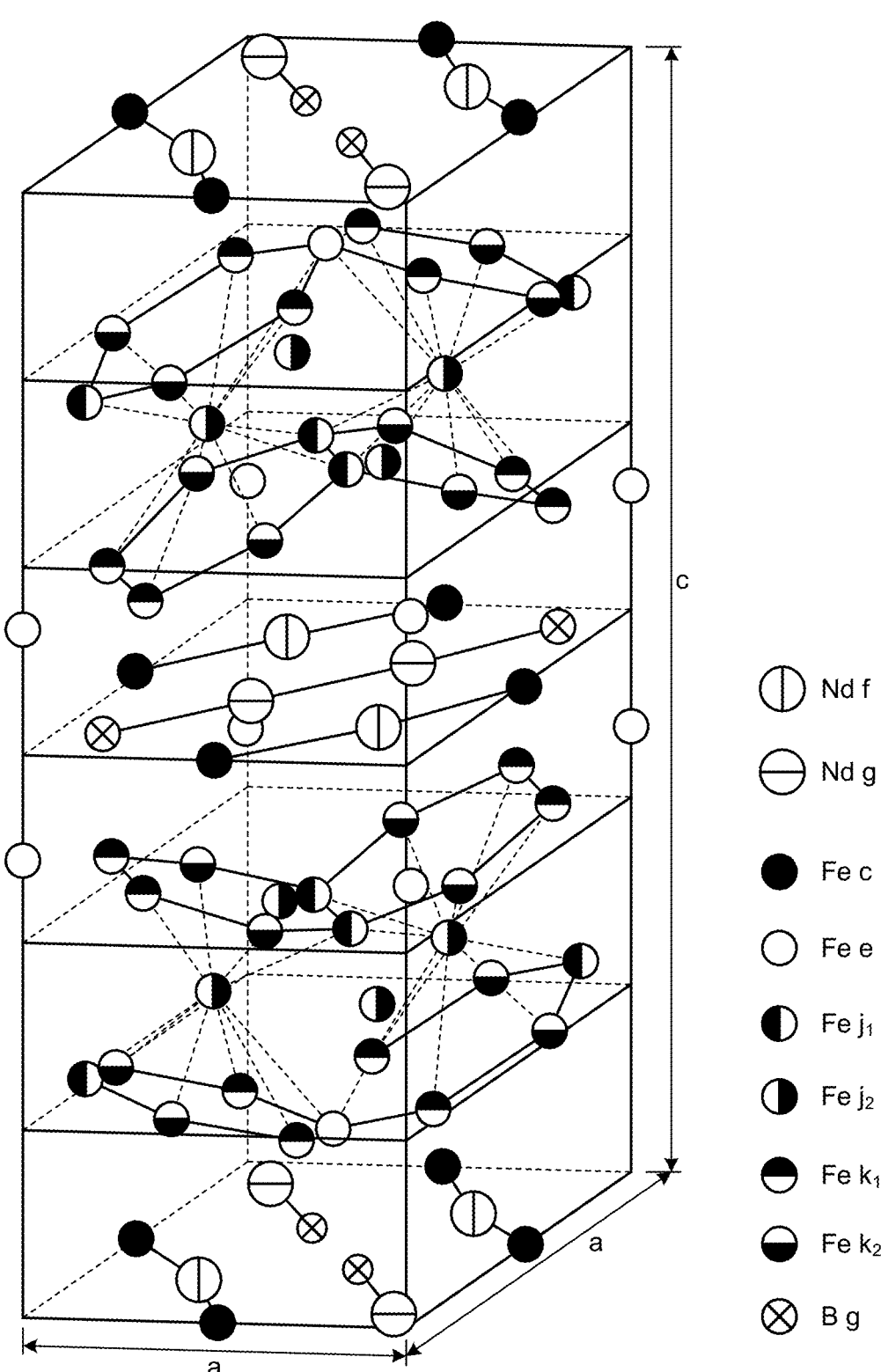
FIG. 2 is a diagram illustrating atomic sites in a tetragonal $Nd_2Fe_{14}B$ crystal structure.

Next, a description will be made as to at which atomic sites of the tetragonal $R_2Fe_{14}B$ crystal structure La and Sm replace the associated atoms. FIG. 2 is a diagram illustrating atomic sites in a tetragonal $Nd_2Fe_{14}B$ crystal structure (source: J. F. Herbst et al., PHYSICAL REVIEW B, Vol. 29, No. 7, pp. 4176-4178, 1984). The sites of substitution are determined from the numerical value of the stabilization energy associated with substitution computed using band calculation and molecular field approximation based on the Heisenberg model.

First, a method for calculating stabilization energy in La will be described. The stabilization energy in La can be computed as the energy difference between ($Nd_7La_1$) $Fe_{56}B_4$+Nd and $Nd_8(Fe_{55}La_1)B_4$+Fe, using $Nd_8Fe_{56}B_4$ crystal cells. A site with a smaller energy value becomes more stable when the associated atom at that site is replaced. That is, La easily replace an atom at an atomic site having the smallest energy among the atomic sites. This calculation assumes that when La replaces the original atom, the difference in atomic radius does not cause a change of the lattice constant in the tetragonal $R_2Fe_{14}B$ crystal structure.

Table 1 shows the stabilization energy of La at each substitution site at various environmental temperatures.

TABLE 1

| Substitution site for La | Temperature | | | | | |
|---|---|---|---|---|---|---|
| | 293 k | 500 K | 1000 K | 1300 K | 1400 K | 1500 K |
| Nd(f) | −136.372 | −84.943 | −48.524 | −40.132 | −38.132 | −35.451 |
| Nd(g) | −132.613 | −82.740 | −47.442 | −38.211 | −36.358 | −34.753 |
| Fe(k1) | −135.939 | −80.596 | −41.428 | −32.390 | −30.237 | −17.095 |
| Fe(k2) | −127.480 | −75.638 | −38.948 | −30.482 | −28.466 | −26.719 |
| Fe(j1) | −124.248 | −73.076 | −38.003 | −29.754 | −27.791 | −26.089 |
| Fe(j2) | −117.148 | −71.400 | −35.923 | −28.816 | −26.917 | −25.271 |
| Fe(e) | −130.814 | −77.593 | −39.926 | −31.235 | −29.164 | −27.371 |
| Fe(c) | −148.317 | −87.850 | −45.055 | −35.179 | −32.828 | −30.789 |

Unit: eV

Table 1 indicates that stable substitution sites for La are Nd (f) sites at temperatures of 1000K and higher, and Fe (c) sites at temperatures of 293K and 500K. As will be described later, the raw material of the rare earth sintered magnet 1 according to the first embodiment is heated and melted at a temperature of 1000K or higher and subsequently rapidly cooled. It is therefore considered that the temperature of the raw material of the rare earth sintered magnet 1 is maintained at 1000K or higher, that is, 727° C. or higher. When the rare earth sintered magnet 1 is produced using the production method as will be described later, it is considered that La is substituted for Nd at Nd (f) sites or Nd (g) sites even at room temperature. La is considered to be preferentially substituted for Nd at energetically stable Nd (f) sites, but may be substituted for Nd at Nd (g) sites having a small energy difference from the Nd (f) sites. This is why Nd (g) sites are mentioned as a candidate for the substitution sites for La. This is also supported by a research report (source: YAO Qingrong et al., JOURNAL OF RARE EARTHS, Vol. 34, No. 11, pp. 1121-1125, 2016). According to this research report, when an La—Fe—B alloy is melted at 1073K, that is, 800° C. and subsequently cooled with ice water, tetragonal $La_2Fe_{14}B$ is formed, that is, La does not enter Fe (c) sites but enters sites corresponding to Nd (f) sites or Nd (g) sites in FIG. 2.

Next, a method for calculating the stabilization energy in Sm will be described. The stabilization energy of Sm can be computed as the energy difference between ($Nd_7Sm_1$) $Fe_{56}B_4$+Nd and $Nd_8(Fe_{55}Sm_1)B_4$+Fe. As with the case of La, atomic substitution does not cause a change of the lattice constant in the tetragonal $R_2Fe_{14}B$ crystal structure. Table 2 shows the stabilization energy of Sm at each substitution site at various environmental temperatures.

TABLE 2

| Substitution site for Sm | Temperature | | | | | |
|---|---|---|---|---|---|---|
| | 293 k | 500 K | 1000 K | 1300K | 1400 K | 1500K |
| Nd(f) | −164.960 | −101.695 | −56.921 | −46.589 | −44.128 | −41.976 |
| Nd(g) | −168.180 | −103.583 | −57.865 | −47.315 | −44.803 | −42.626 |
| Fe(k1) | −136.797 | −80.098 | −41.679 | −32.583 | −17.350 | −16.343 |
| Fe(k2) | −127.769 | −75.808 | −38.482 | −29.603 | −28.528 | −25.696 |
| Fe(j1) | −122.726 | −73.304 | −37.783 | −28.392 | −26.525 | −24.681 |
| Fe(j2) | −124.483 | −73.883 | −38.072 | −28.483 | −26.610 | −24.985 |
| Fe(e) | 125.937 | 72.525 | 35.301 | 26.633 | 24.450 | 22.782 |
| Fe(c) | −155.804 | −94.457 | −48.359 | −37.720 | −35.187 | −32.992 |

Unit: eV

Table 2 indicates that stable substitution sites for Sm are Nd (g) sites at any temperature. Sm is considered to be preferentially substituted for Nd at energetically stable Nd (g) sites, but may be substituted for Nd at Nd (f) sites having a small energy difference from the Nd (g) sites.

As described above, the rare earth sintered magnet 1 according to the first embodiment includes the main phase 10 and the crystalline subphase 20, the main phase 10 satisfying general formula (Nd, La, Sm)—Fe—B and including a crystal grain based on an $R_2Fe_{14}B$ crystal structure, the subphase 20 being based on an oxide phase represented by (Nd, La, Sm)—O. The subphase 20 has a higher concentration of Sm than the main phase 10. Consequently, Sm contributes to allowing Nd relatively to diffuse throughout the main phase 10, resulting in improved magnetization of the main phase 10 and improved residual magnetic flux density. That is, a relative decrease in the concentration of Nd in the main phase 10 is prevented. As a result, the rare earth sintered magnet 1 can maintain high magnetic properties at room temperature as well as preventing the magnetic properties from degrading with temperature rise, reducing the use of Nd and Dy.

In the rare earth sintered magnet 1 according to the first embodiment, La is segregated in the subphase 20. Accordingly, La allows Nd relatively to diffuse throughout the main phase 10, and Nd in the main phase 10 is not consumed at the grain boundary, leading to improved magnetization. As a result, it is possible to maintain high magnetic properties at room temperature as well as preventing magnetic properties from degrading with temperature rise. In addition, it is possible to maintain high coercive force even without adding an element contributing to improvement of magnetic properties such as Co and Ni as in Patent Literature 2.

Furthermore, the main phase 10 includes the core portion 11 and the shell portion 12 placed on the outer periphery of the core portion 11, and the shell portion 12 has a higher concentration of Nd than the core portion 11. Consequently, it is possible to improve magnetic anisotropy, prevent magnetization reversal, and maintain high magnetic properties at room temperature.

In addition, La segregated in the subphase 20 coats at least a part of the surface of the main phase 10. Furthermore, $1<Y_2/Y_1<X_2/X_1$ holds, where $X_1$ represents the concentration of La contained in the main phase 10, $X_2$ represents the concentration of La contained in the subphase 20, $Y_1$ represents the concentration of Sm contained in the main phase 10, and $Y_2$ represents the concentration of Sm contained in the subphase 20. Consequently, La is segregated in the grain boundary in the process of production, and allows Nd to relatively diffuse throughout the main phase 10. As a result, it is possible to prevent a relative decrease in the concentration of Nd in the main phase 10 due to consumption of Nd at the grain boundary, and to maintain high magnetic properties at room temperature as well as preventing magnetic properties from degrading with temperature rise.

Second Embodiment

In the second embodiment, a description will be made as to a method for producing the rare earth sintered magnet 1 described in the first embodiment. As such a method is separated into a method for producing a rare earth magnet alloy that is the raw material of the rare earth sintered magnet 1 and a method for producing the rare earth sintered magnet 1 using the rare earth magnet alloy, these two methods will be hereinbelow described individually.

Figure 3:
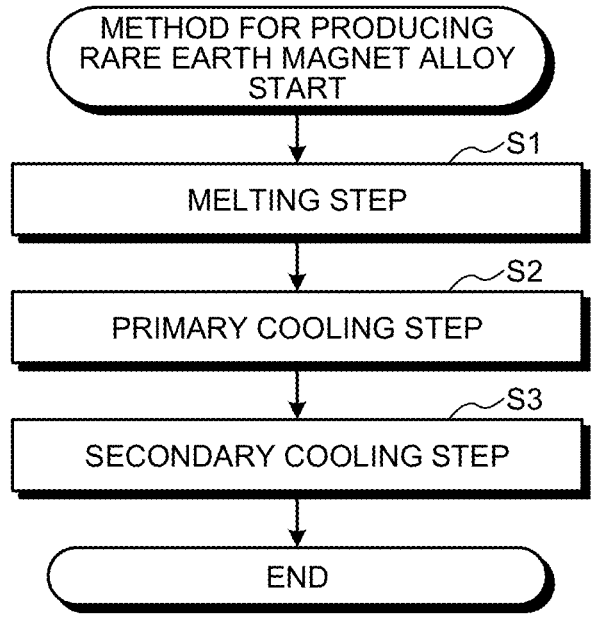
FIG. 3 is a flowchart illustrating an exemplary procedure of a method for producing a rare earth magnet alloy according to a second embodiment.
Figure 4:
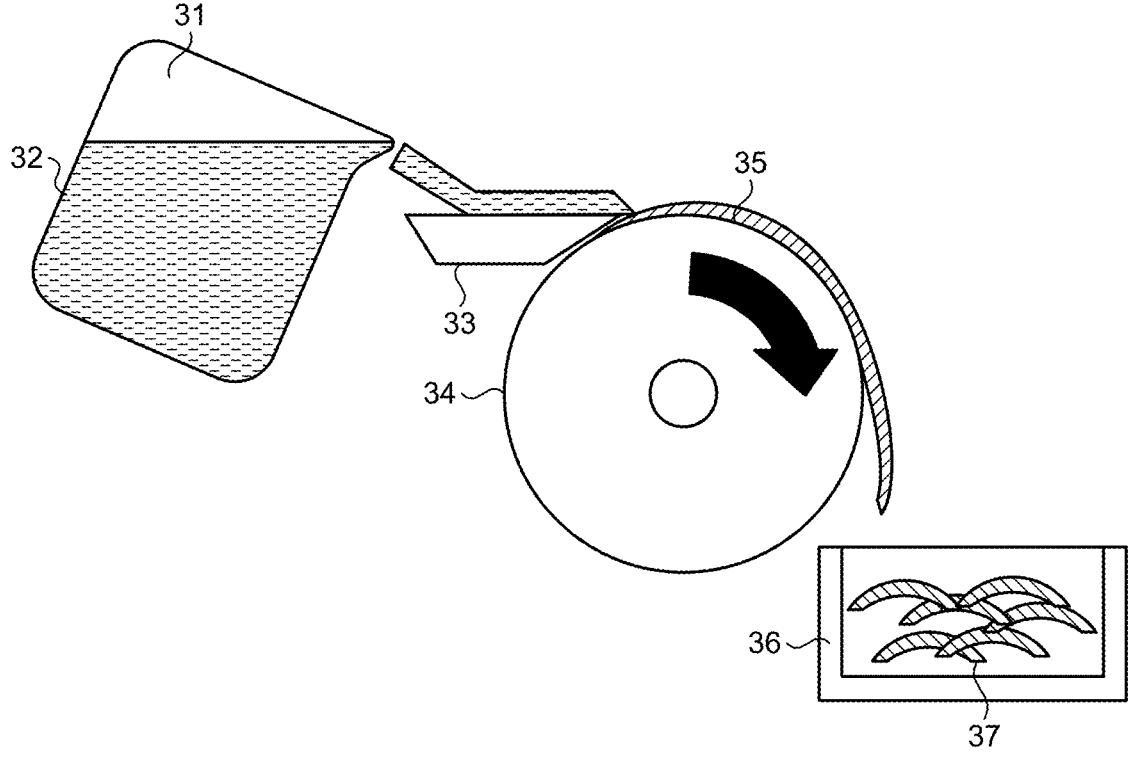
FIG. 4 is a diagram schematically illustrating the method for producing a rare earth magnet alloy according to the second embodiment.

FIG. 3 is a flowchart illustrating an exemplary procedure of a method for producing a rare earth magnet alloy according to the second embodiment. FIG. 4 is a diagram schematically illustrating the method for producing a rare earth magnet alloy according to the second embodiment.

First, as illustrated in FIG. 3, the method for producing a rare earth magnet alloy includes a melting step (step S1) of heating and melting the raw material of the rare earth magnet alloy at a temperature of 1000K or higher, a primary cooling step (step S2) of cooling the molten raw material on a rotating body to obtain a solidified alloy, and a secondary cooling step (step S3) of further cooling the solidified alloy in a container. Each step will be described below.

In the melting step S1, as illustrated in FIG. 4, the raw material of the rare earth magnet alloy is heated and melted at a temperature of 1000K or higher in a crucible 31 in an atmosphere containing an inert gas such as argon (Ar) or in a vacuum. Consequently, the rare earth magnet alloy melts into a molten alloy 32. A combination of materials of Nd, La, Sm, Fe, and B can be used as the raw material. At this time, one or more elements selected from the group consisting of Al, Cu, Co, Zr, Ti, Ga, Pr, Nb, Dy, Tb, Mn, Gd, and Ho may be contained as the additive element M in the raw material.

Next, in the primary cooling step S2, as illustrated in FIG. 4, the molten alloy 32 prepared in the melting step is fed to a tundish 33, and subsequently fed onto a single roll 34 which is a rotating body rotating in the direction of the arrow. Consequently, the molten alloy 32 is rapidly cooled on the single roll 34, such that a solidified alloy 35 that is thinner than the ingot alloy is prepared on the single roll 34 from the molten alloy 32. In this example, the single roll 34 is used as the rotating body, but the present disclosure is not limited thereto, and twin rolls, a rotating disk, a rotating cylindrical mold, or the like may be used for rapid contact cooling. From the viewpoint of efficiently obtaining the thin solidified alloy 35, the cooling rate in the primary cooling step is preferably in the range of $10°$ C./s to $10^{7°}$ C./s, and more preferably in the range of $10^{3°}$ C./s to $10^{4°}$ C./s. The thickness of the solidified alloy 35 is in the range of 0.03 mm to 10 mm. The molten alloy 32 starts to be solidified at the portion in contact with the single roll 34, allowing crystals to grow in a columnar or needle shape in the thickness direction from the contact surface with the single roll 34.

Thereafter, in the secondary cooling step S3, as illustrated in FIG. 4, the thin solidified alloy 35 prepared in the primary cooling step is placed in a tray container 36 and cooled. When entering the tray container 36, the thin solidified alloy 35 is crushed into scale-shaped pieces of rare earth magnet alloy 37 and cooled. Depending on the cooling rate, ribbon-shaped pieces of rare earth magnet alloy 37 may be obtained, instead of scale-shaped pieces. From the viewpoint of obtaining the rare earth magnet alloy 37 having a structure with favorable temperature properties of magnetic properties, the cooling rate in the secondary cooling step is preferably in the range of $10^{-2°}$ C./s to $10^{3°}$ C./s, and more preferably in the range of $10^{-1°}$ C./s to $10^{2°}$ C./s.

The rare earth magnet alloy 37 obtained through these steps has a fine crystal structure containing a (Nd, La, Sm)—Fe—B crystal phase having a minor-axis size of 3 μm to 10 μm and a major-axis size of 10 μm to 300 μm, and a crystalline oxide subphase represented by (Nd, La, Sm)—O. The crystalline oxide subphase represented by (Nd, La, Sm)—O is hereinafter referred to as the (Nd, La, Sm)—O phase. The (Nd, La, Sm)—O phase is a nonmagnetic phase made of an oxide having a relatively high concentration of rare earth elements. The thickness of the (Nd, La, Sm)—O phase is 10 μm or less, corresponding to the width of the grain boundary. Having undergone the step of rapid cooling, the rare earth magnet alloy 37 produced by the above production method has a refined structure and a small crystal grain size compared with the rare earth magnet alloy obtained with mold casting.

FIG. 5 is a flowchart illustrating an exemplary procedure of a method for producing a rare earth sintered magnet according to the second embodiment. As illustrated in FIG. 5, the method for producing the rare earth sintered magnet 1 includes a pulverizing step (step S21) of pulverizing the rare earth magnet alloy 37 having the (Nd, La, Sm)—Fe—B crystal phase and the (Nd, La, Sm)—O phase, a molding step (step S22) of preparing a molded body by molding the pulverized rare earth magnet alloy 37, a sintering step (step S23) of obtaining a sintered body by sintering the molded body, and an aging step (step S24) of aging the sintered body.

In the pulverizing step S21, the rare earth magnet alloy 37 produced in accordance with the method for producing the rare earth magnet alloy 37 in FIG. 3 is pulverized into rare earth magnet alloy powder having a grain size of 200 μm or less, preferably in the range of 0.5 μm to 100 μm. The pulverization of the rare earth magnet alloy 37 is performed using, for example, an agate mortar, a stamp mill, a jaw crusher, or a jet mill. In particular, for reducing the grain size of the powder, it is preferable to pulverize the rare earth magnet alloy 37 in an atmosphere containing an inert gas. By pulverizing the rare earth magnet alloy 37 in an atmosphere containing an inert gas, it is possible to prevent oxygen from mixing into the powder. However, unless the pulverization atmosphere affects the magnetic properties of the magnet, the rare earth magnet alloy 37 may be pulverized in the air.

In the molding step S22, the powder of the rare earth magnet alloy 37 is compression-molded in a mold under a magnetic field to prepare a molded body. The applied magnetic field can be 2 T in one example. Note that the molding may be performed not in a magnetic field but without applying a magnetic field.

In the sintering step S23, the molded body generated by compression molding is held at a sintering temperature in the range of 600° C. to 1300° C. for a period of time in the range of 0.1 hours to 10 hours, whereby a sintered body is obtained. The sintering is preferably performed in an atmosphere containing an inert gas or in a vacuum in order to prevent oxidation. The sintering may be performed applying a magnetic field. In addition, the sintering step may additionally include a step of hot working or aging treatment in order to improve magnetic properties, that is, to induce magnetic field anisotropy or to improve coercive force. The sintering step may further include a step of infiltrating a compound containing Cu, Al, a heavy rare earth element, and the like into the crystal grain boundary, i.e. the boundary between the main phases 10.

In the aging step S24, the sintered body is held at a temperature equal to or lower than the sintering temperature for a period of time in the range of 0.1 hours to 20 hours, whereby the magnetic structure is optimized. The aging may be performed applying a magnetic field.

By controlling the temperature and the period of time in the sintering and aging steps described above, it is possible to produce the rare earth sintered magnet 1 including the main phase 10 and the subphase 20 having La segregated therein, the concentration of Sm being higher in the subphase 20 than in the main phase 10, the main phase 10 including the core portion 11 and the shell portion 12 around the core portion 11, the concentration of Nd being higher in the shell portion 12 than in the core portion 11.

In the second embodiment, the rare earth magnet alloy 37 having the (Nd, La, Sm)—Fe—B crystal phase and the (Nd, La, Sm)—O phase is pulverized into rare earth magnet alloy powder, which is then molded. Thereafter, the molded body is sintered to form a sintered body, and the sintered body is aged into the rare earth sintered magnet 1. The rare earth sintered magnet 1 according to the first embodiment can thus be produced. By holding in the aging step the sintered body at a temperature equal to or lower than the sintering temperature for a period of time in the range of 0.1 hours to 20 hours, it is possible to produce the rare earth sintered magnet 1 including the main phase 10 and the subphase 20 having La segregated therein, the concentration of Sm being higher in the subphase 20 than in the main phase 10, the main phase 10 including the core portion 11 and the shell portion 12 around the core portion 11, the concentration of Nd being higher in the shell portion 12 than in the core portion 11.

Third Embodiment

Next, a rotor equipped with the rare earth sintered magnet 1 according to the first embodiment will be described. FIG. 6 is a cross-sectional view schematically illustrating an exemplary configuration of a rotor equipped with a rare earth sintered magnet according to the third embodiment. FIG. 6 depicts a cross section in a direction perpendicular to a rotation axis RA of a rotor 100.

The rotor 100 is rotatable about the rotation axis RA. The rotor 100 includes a rotor core 101 and the rare earth sintered magnet 1 inserted into a magnet insertion hole 102 provided in the rotor core 101 along the circumferential direction of the rotor 100. In FIG. 6, four rare earth sintered magnets 1 are used, but the number of rare earth sintered magnets 1 is not limited thereto, and may be changed depending upon the design of the rotor 100. In FIG. 6, four magnet insertion holes 102 are provided, but the number of magnet insertion holes 102 is not limited thereto, and may be changed depending upon the number of rare earth sintered magnets 1. The rotor core 101 is formed by a plurality of disk-shaped electromagnetic steel sheets stacked in the axial direction of the rotation axis RA.

The rare earth sintered magnets 1 have the structure described in the first embodiment and are produced in accordance with the production method described in the second embodiment. Each of the four rare earth sintered magnets 1 is inserted into the corresponding magnet insertion hole 102. The four rare earth sintered magnets 1 are magnetized such that the magnetic poles of adjacent ones of the rare earth sintered magnets 1 on the radially outer side of the rotor 100 differ from each other.

A decrease in the coercive force of the rare earth sintered magnets 1 in a high temperature environment will make the operation of the rotor 100 unstable. In the case where the rare earth sintered magnets 1 produced in accordance with the production method described in the second embodiment are used as the rare earth sintered magnets 1, the absolute values of the temperature coefficients of magnetic properties are small as will be described later in Examples. This results in preventing degradation of magnetic properties even in a high temperature environment exceeding 100° C.

The rotor 100 according to the third embodiment includes the rare earth sintered magnets 1 produced in accordance with the production method described in the second embodiment. Since the rare earth sintered magnets 1 have small absolute values of the temperature coefficients of magnetic properties, it is possible to stabilize the operation of the rotor 100 even in a high temperature environment exceeding 100°

C., and to maintain magnetic properties at room temperature equivalent to those of Nd—Fe—B-based sintered magnets.

Fourth Embodiment

Figure 7:
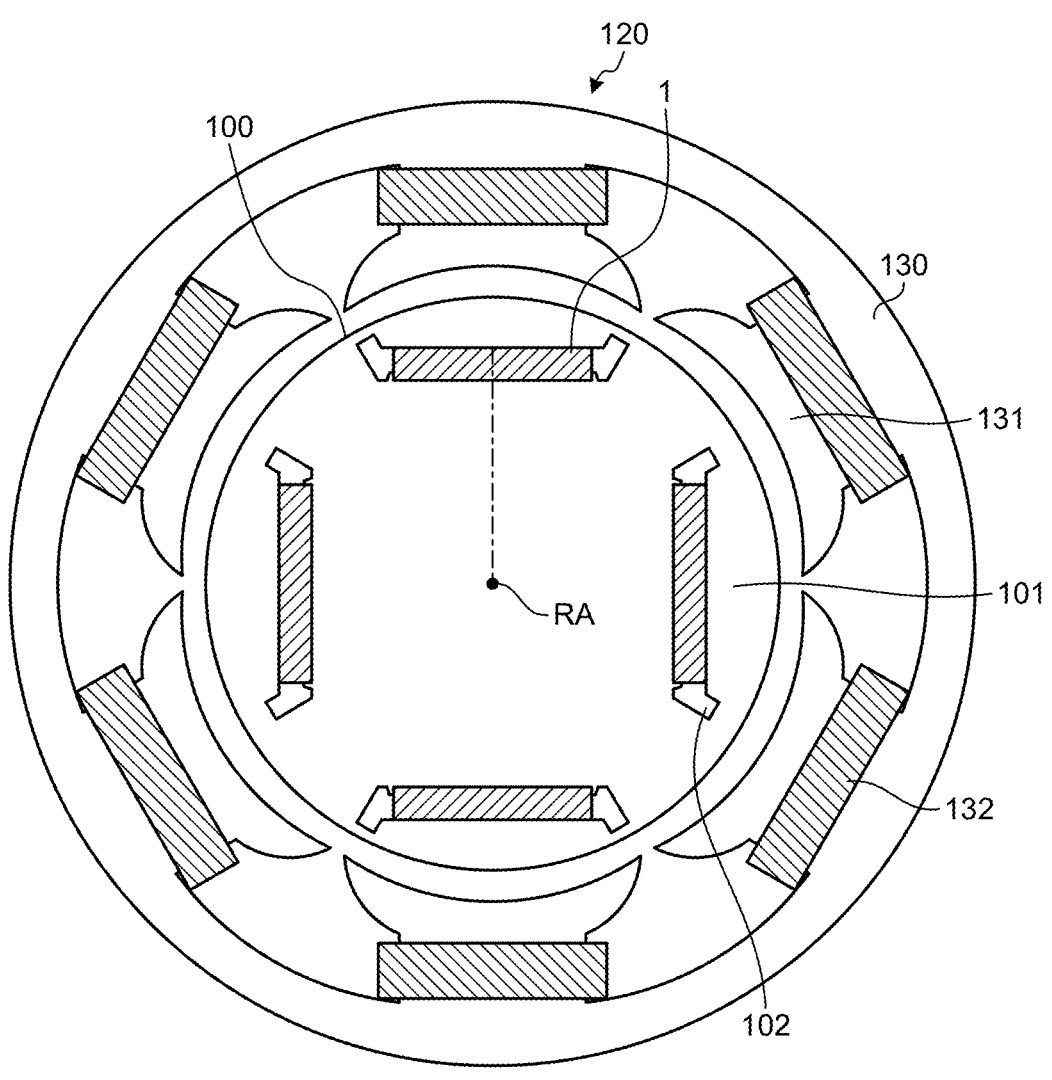
FIG. 7 is a cross-sectional view schematically illustrating an exemplary configuration of a rotary machine equipped with a rotor according to a fourth embodiment.

Next, a rotary machine equipped with the rotor 100 according to the third embodiment will be described. FIG. 7 is a cross-sectional view schematically illustrating an exemplary configuration of a rotary machine equipped with a rotor according to the third embodiment. FIG. 7 depicts a cross section in a direction perpendicular to the rotation axis RA of the rotor 100.

The rotary machine 120 includes the rotor 100 described in the third embodiment, which is rotatable about the rotation axis RA, and an annular stator 130 provided coaxially with the rotor 100 and facing the rotor 100. The stator 130 is formed of a plurality of electromagnetic steel sheets stacked in the axial direction of the rotation axis RA. Another existing configuration can be employed as the configuration of the stator 130, instead of the one described herein. In the stator 130, teeth 131 protruding toward the rotor 100 are provided along the inner surface of the stator 130. Windings 132 are provided on the teeth 131. The winding type of the windings 132 is not limited to concentrated winding, and may be distributed winding. The number of magnetic poles of the rotor 100 in the rotary machine 120 should be not less than two, that is, the number of rare earth sintered magnets 1 should be not less than two. Although the rotor 100 of the interior magnet type is employed in FIG. 7, the rotor 100 of the surface magnet type may be employed which includes the rare earth sintered magnets 1 fixed to the outer circumference with an adhesive.

A decrease in the coercive force of the rare earth sintered magnets 1 in a high temperature environment will make the operation of the rotor 100 unstable. In the case where the rare earth sintered magnets 1 produced with the production method described in the second embodiment are used as the rare earth sintered magnets 1, the absolute values of the temperature coefficients of magnetic properties are small, thereby preventing degradation of magnetic properties even in a high temperature environment exceeding 100° C.

The rotary machine 120 according to the fourth embodiment includes the rotor 100 and the annular stator 130. The rotor 100 has the rare earth sintered magnets 1 produced in accordance with the production method described in the second embodiment. The annular stator 130 faces the rotor 100 and includes, on the inner surface on a side where the rotor 100 is placed, the teeth 131 protruding toward the rotor 100 and the windings 132 provided on the teeth 131. The rare earth sintered magnets 1 used in the rotor 100 have small absolute values of the temperature coefficient of magnetic properties. As a result, it is possible to stably drive the rotor 100 and stabilize the operation of the rotary machine 120 even in a high temperature environment exceeding 100° C., and to maintain magnetic properties at room temperature equivalent to those of Nd—Fe—B-based sintered magnets.

Example 1

The rare earth sintered magnet 1 according to the present disclosure will be hereinafter described in detail with reference to Examples and Comparative Examples.

In Examples 1 to 5 and Comparative Examples 1 to 6, the rare earth sintered magnet 1 is produced by the method described in the second embodiment using R—Fe—B samples of a plurality of rare earth magnet alloys 37 that differ from one another in the composition of the main phase 10. The samples of Examples 1 to 5 and Comparative Examples 1 to 6 differ in R from one another. In Examples 1 to 5 and Comparative Examples 1, 3 to 6, the rare earth sintered magnet 1 is produced using the rare earth magnet alloys 37 that differ from one another in the content of Nd, La, and Sm in R. In Comparative Example 2, the rare earth sintered magnet 1 is produced using the rare earth magnet alloy 37 in which R includes Nd and heavy rare earth element Dy. Table 3 shows the general formulas of the rare earth sintered magnets according to Examples and Comparative Examples, the content of elements of R, and the results of determination of magnetic properties. Table 3 shows the general formula of the main phase 10 of each sample which is the rare earth sintered magnet 1 according to Examples 1 to 5 and Comparative Examples 1 to 6.

TABLE 3

| | | Content | | | | Determination | | | |
| | General formula | Nd | La | Sm | Dy | Residual magnetic flux density | Coercive force | Temperature coefficient of residual magnetic flux density Equivalent | Temperature coefficient of coercive force Equivalent |
|---|---|---|---|---|---|---|---|---|---|
| Comparative Example 1 | Nd—Fe—B | 11.23 | — | — | — | — | — | — | — |
| Comparative Example 2 | (Nd,Dy)—Fe—B | 10.01 | — | — | 1.12 | Poor | Good | Equivalent | Equivalent |
| Comparative Example 3 | (Nd,La)—Fe—B | 10.98 | 0.31 | — | — | Good | Poor | Poor | Poor |
| Comparative Example 4 | (Nd,La)—Fe—B | 10.22 | 1.01 | — | — | Poor | Poor | Poor | Poor |
| Comparative Example 5 | (Nd,Sm)—Fe—B | 11.02 | — | 0.29 | — | Poor | Poor | Poor | Poor |
| Comparative Example 6 | (Nd,Sm)—Fe—B | 10.22 | — | 1.01 | — | Poor | Poor | Poor | Poor |
| Example 1 | (Nd,La,Sm)—Fe—B | 10.97 | 0.09 | 0.07 | — | Good | Good | Good | Good |
| Example 2 | (Nd,La,Sm)—Fe—B | 10.73 | 0.25 | 0.25 | — | Good | Good | Good | Good |
| Example 3 | (Nd,La,Sm)—Fe—B | 10.27 | 0.51 | 0.45 | — | Good | Good | Good | Good |
| Example 4 | (Nd,La,Sm)—Fe—B | 10.55 | 0.35 | 0.33 | — | Good | Good | Good | Good |
| Example 5 | (Nd,La,Sm)—Fe—B | 8.41 | 1.01 | 1.01 | — | Good | Good | Good | Good |

Next, a method for analyzing the structure of the rare earth sintered magnet 1 according to Examples 1 to 5 and Comparative Examples 1 to 6 will be described. The structure form of the rare earth sintered magnet 1 is determined by elemental analysis using a scanning electron microscope (SEM) and an electron probe microanalyzer (EPMA). A field emission electron probe microanalyzer (produced by JEOL Ltd., product name: JXA-8530F) is used as the SEM and the EPMA. Conditions for the elemental analysis are as follows: acceleration voltage: 15.0 kV, irradiation current: 2.271 $e^{-008}$A, irradiation time: 130 ms, number of pixels: 512 pixels×512 pixels, magnification: 5000 times, number of integrations: one.

Next, a method for evaluating the magnetic properties of the rare earth sintered magnet 1 according to Examples 1 to 5 and Comparative Examples 1 to 6 will be described. The evaluation of the magnetic properties is performed by measuring the coercive force of a plurality of samples using a pulse excitation BH tracer. The maximum applied magnetic field obtained by the BH tracer is equal to or greater than 6 T, at which the rare earth magnet alloy 37 is completely magnetized. The pulse excitation BH tracer may be replaced with a direct current self-registering magnetometer also called a direct current BH tracer, a vibrating sample magnetometer (VSM), a magnetic property measurement system (MPMS), a physical property measurement system (PPMS), or the like, provided that a maximum applied magnetic field of 6T or more can be generated. The measurement is performed in an atmosphere containing an inert gas such as nitrogen. The magnetic properties of each sample are measured at a first measurement temperature T1 and a second measurement temperature T2 different from each other. The temperature coefficient α [%/° C.] of residual magnetic flux density is a value obtained by computing the ratio of the difference between the residual magnetic flux density at the first measurement temperature T1 and the residual magnetic flux density at the second measurement temperature T2 to the residual magnetic flux density at the first measurement temperature T1, and dividing the ratio by the difference in temperature (T2–T1). The temperature coefficient β [%/° C.] of coercive force is a value obtained by computing the ratio of the difference between the coercive force at the first measurement temperature T1 and the coercive force at the second measurement temperature T2 to the coercive force at the first measurement temperature T1, and dividing the ratio by the difference in temperature (T2–T1). Thus, the smaller the absolute values |α| and |β| of the temperature coefficients of the magnetic properties, the more effectively degradation of the magnetic properties of the magnet with respect to temperature rise is prevented.

Figure 8:
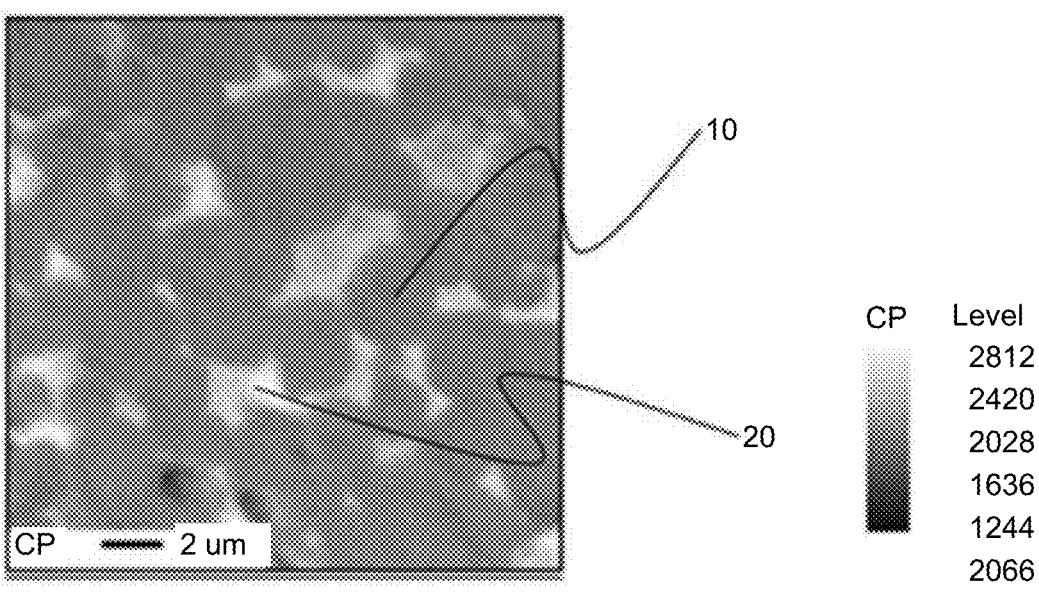
FIG. 8 is a composition image obtained by analyzing a cross section of a rare earth sintered magnet according to Examples 1 to 5 with a field emission electron probe microanalyzer.
Figure 9:
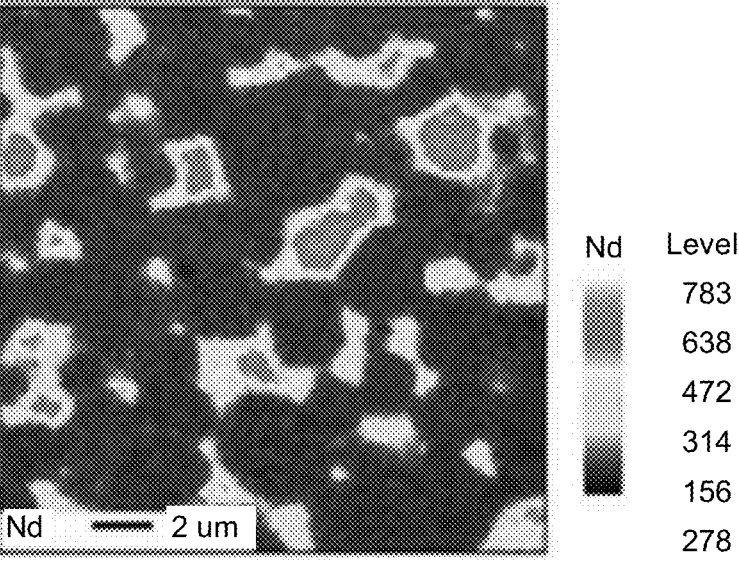
FIG. 9 is an element map of Nd obtained by analyzing a cross section of a rare earth sintered magnet according to Examples 1 to 5 with FE-EPMA.
Figure 10:
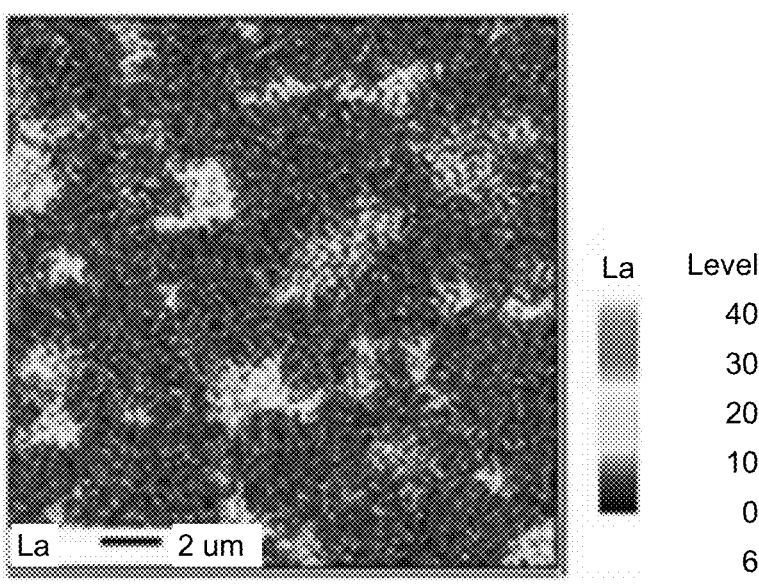
FIG. 10 is an element map of La obtained by analyzing a cross section of a rare earth sintered magnet according to Examples 1 to 5 with FE-EPMA.
Figure 11:
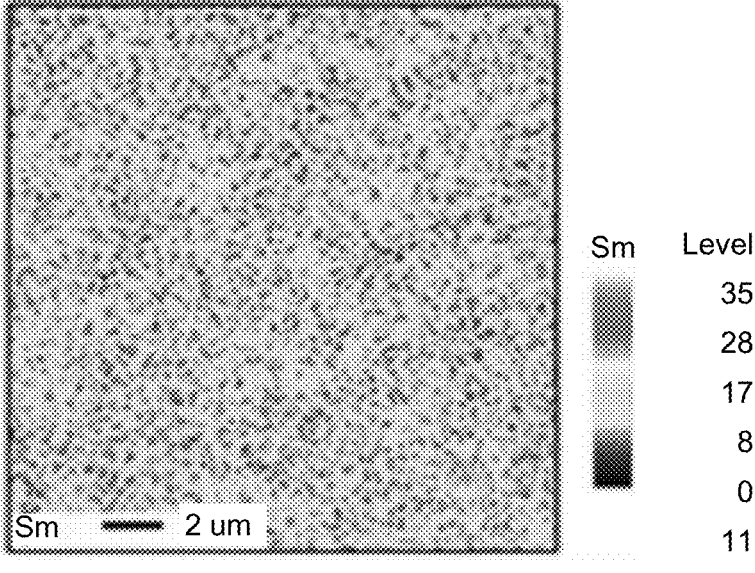
FIG. 11 is an element map of Sm obtained by analyzing a cross section of a rare earth sintered magnet according to Examples 1 to 5 with FE-EPMA.
Figure 12:
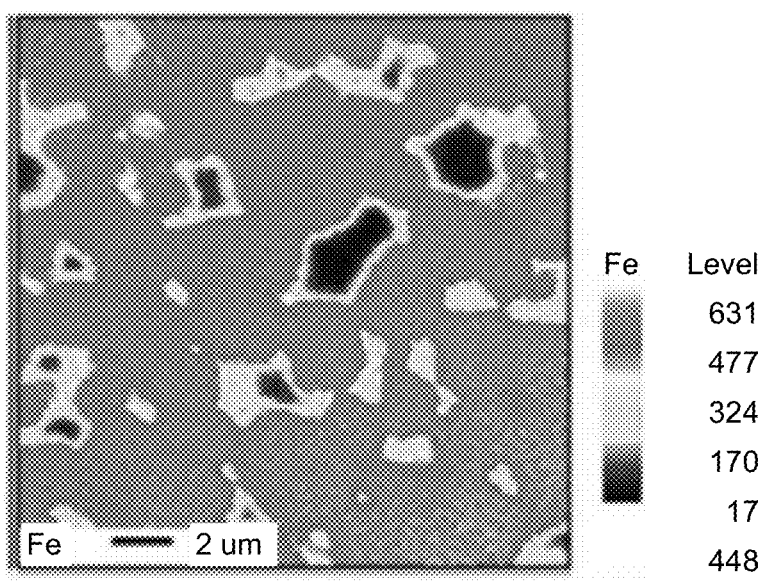
FIG. 12 is an element map of Fe obtained by analyzing a cross section of a rare earth sintered magnet according to Examples 1 to 5 with FE-EPMA.
Figure 13:
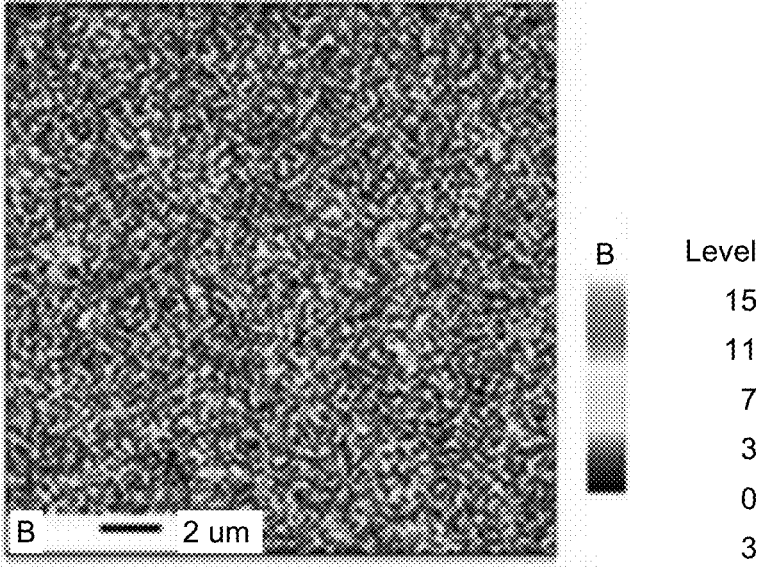
FIG. 13 is an element map of B obtained by analyzing a cross section of a rare earth sintered magnet according to Examples 1 to 5 with FE-EPMA.

First, the results of analysis of the samples according to Examples 1 to 5 and Comparative Examples 1 to 6 will be described. FIG. 8 is a composition image obtained by analyzing a cross section of a rare earth sintered magnet according to Examples 1 to 5 with a field emission electron probe microanalyzer (FE-EPMA). FIGS. 9 to 13 are element maps obtained by analyzing a cross section of a rare earth sintered magnet according to Examples 1 to 5 with FE-EPMA. FIG. 9 is an element map of Nd, FIG. 10 is an element map of La, FIG. 11 is an element map of Sm, FIG. 12 is an element map of Fe, and FIG. 13 is an element map of B. Note that FIGS. 9 to 13 are the element maps corresponding to the region illustrated in FIG. 8. Since the rare earth sintered magnets 1 according to Examples 1 to 5 all yield similar results, FIGS. 8 to 13 are about a representative one of Examples 1 to 5.

It is confirmed from FIG. 8 that each of the samples of Examples 1 to 5 contains the main phase 10 which is a crystal grain based on an $R_2Fe_{14}B$ crystal structures and the crystalline subphase 20 which is the (Nd, La, Sm)—O phase. It is also confirmed from FIG. 10 that in each of the samples of Examples 1 to 5, La is segregated in the subphase 20, and the subphase 20 having La segregated therein coats at least a part of the surface of the main phase 10. It is confirmed from FIG. 11 that Sm is dispersed in the main phase 10 and the subphase 20 with a difference in concentration between the main phase 10 and the subphase 20, and the concentration of Sm is higher in the subphase 20 than in the main phase 10.

In addition, it is confirmed from the intensity ratio of the element maps obtained by analysis with FE-EPMA that $1<Y_2/Y_1<X_2/X_1$ holds, where $X_1$ represents the concentration of La present in the main phase 10, $X_2$ represents the concentration of La present in the subphase 20, $Y_1$ represents the concentration of Sm present in the main phase 10, and $Y_2$ represents the concentration of Sm present in the subphase 20.

Figure 14:
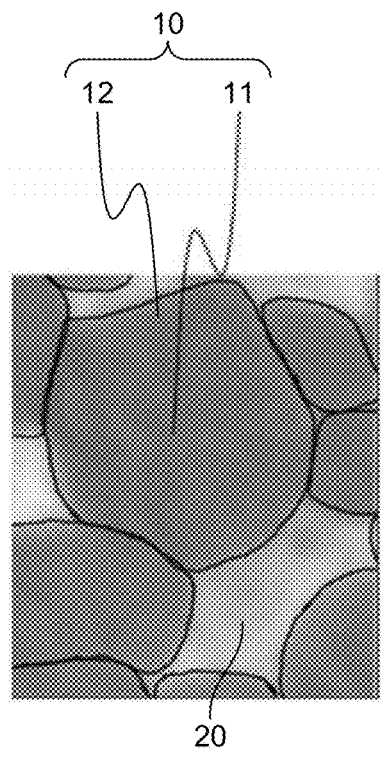
FIG. 14 is a diagram illustrating the core-shell structure of Nd in the main phase of the composition image in FIG. 8 by comparison between the composition image in FIG. 8 and the element map of Nd in FIG. 9.
Figure 15:
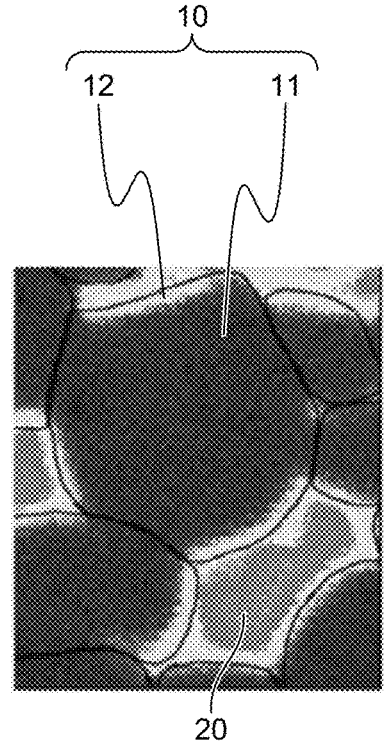
FIG. 15 is a diagram illustrating the core-shell structure of Nd in the main phase of the element map of Nd in FIG. 9 by comparison between the composition image in FIG. 8 and the element map of Nd in FIG. 9.

FIG. 14 is a diagram illustrating the core-shell structure of Nd in the main phase of the composition image in FIG. 8 by comparison between the composition image in FIG. 8 and the element map of Nd in FIG. 9. FIG. 15 is a diagram illustrating the core-shell structure of Nd in the main phase of the element map of Nd in FIG. 9 by comparison between the composition image in FIG. 8 and the element map of Nd in FIG. 9. In FIGS. 14 and 15, the outline of the main phase 10 is indicated by black lines. It is confirmed from FIGS. 14 and 15 that the main phase 10 includes the core portion 11 and the shell portion 12 present at the peripheral edge thereof, and the concentration of Nd is higher in the shell portion 12 than in the core portion 11.

Note that Fe is substantially uniformly distributed in the main phase 10 as illustrated in FIG. 12, and B is substantially uniformly distributed in the entire sample as illustrated in FIG. 13.

Next, the results of measurement of the magnetic properties in each sample according to Examples 1 to 5 and Comparative Examples 1 to 6 will be described. The shape of each sample subjected to magnetic measurement is a block shape having a length, a width, and a height, all of which are 7 mm. The first measurement temperature T1 is 23° C., and the second measurement temperature T2 is 200° C. 23° C. is room temperature. 200° C. is a temperature that is a possible temperature as an environment under which automobile motors and industrial motors operate. Residual magnetic flux density and coercive force are determined in comparison with Comparative Example 1. When the values of the residual magnetic flux density and the coercive force of each sample at 23° C. are within an allowable measurement error of 1% as compared with the values of Comparative Example 1, the values are rated as "equivalent". Values of the residual magnetic flux density and the coercive force, which have the error of 1% or more higher, are rated as "good". Values of the residual magnetic flux density and the coercive force, which have the error of 1% or more lower, are rated as "poor".

The temperature coefficient α of residual magnetic flux density is calculated using the residual magnetic flux density at 23° C. and the residual magnetic flux density at 200° C. The temperature coefficient β of coercive force is calculated using the coercive force at 23° C. and the coercive force at 200° C. The temperature coefficient of residual magnetic flux density and the temperature coefficient of coercive force in each sample according to Examples 1 to 5 and Comparative Examples 2 to 6 are determined in comparison with Comparative Example 1. When the values of the temperature coefficient of residual magnetic flux density and the temperature coefficient of coercive force for each sample are within an allowable measurement error of ±1% as compared with the absolute value |α| of the temperature coefficient of residual magnetic flux density and the absolute value |β| of the temperature coefficient of coercive force in the sample of Comparative Example 1, the values are rated as "equivalent". Values of the temperature coefficient of residual magnetic flux density and the temperature coefficient of coercive force, which have the error of 1% or more lower, are rated as "good". Values of the temperature coefficient of residual magnetic flux density and the temperature coefficient of coercive force, which have the error of 1% or more higher, are rated as "poor". The results of determination of the residual magnetic flux density, the coercive force, the temperature coefficient of residual magnetic flux density, and the temperature coefficient of coercive force are shown in Table 3.

Comparative Example 1 is a sample of the rare earth sintered magnet 1 prepared in the form of Nd—Fe—B in accordance with the production method according to the second embodiment using Nd, Fe, and FeB as raw materials. The evaluation of the magnetic properties of this sample in accordance with the method described above shows that the residual magnetic flux density is 1.3 T and the coercive force is 1000 kA/m. The temperature coefficients of residual magnetic flux density and coercive force are |α|=0.191%/° C. and |β|=0.460%/° C., respectively. These values of Comparative Example 1 are used as a reference.

Comparative Example 2 is a sample of the rare earth sintered magnet 1 prepared in the form of (Nd, Dy)—Fe—B in accordance with the production method according to the second embodiment using Nd, Dy, Fe, and FeB as raw materials. The evaluation of the magnetic properties of this sample in accordance with the method described above shows that the residual magnetic flux density is "poor", the coercive force is "good", the temperature coefficient of residual magnetic flux density is "equivalent", and the temperature property evaluation of coercive force is "equivalent". This result indicates that the coercive force is improved by substituting Dy having high magnetocrystalline anisotropy for a part of Nd.

Comparative Example 3 is a sample of the rare earth sintered magnet 1 prepared in the form of (Nd, La)—Fe—B in accordance with the production method according to the second embodiment using Nd, La, Fe, and FeB as raw materials. The evaluation of the magnetic properties of this sample in accordance with the method described above shows that the residual magnetic flux density is "good", the coercive force is "poor", the temperature coefficient of residual magnetic flux density is "poor", and the temperature property evaluation of coercive force is "poor". This result indicates that by segregating the La element in the grain boundary, the concentration of Nd present in the main phase 10 increases, and excellent magnetic flux density is obtained at room temperature.

Comparative Example 4 is a sample of the rare earth sintered magnet 1 prepared in the form of (Nd, La)—Fe—B in accordance with the production method according to the second embodiment using Nd, La, Fe, and FeB as raw materials. The evaluation of the magnetic properties of this sample in accordance with the method described above shows that the residual magnetic flux density is "poor", the coercive force is "poor", the temperature coefficient of residual magnetic flux density is "poor", and the temperature property evaluation of coercive force is "poor". This result indicates that because the content of La is too high compared with Comparative Example 3, an optimal magnetic structure is not formed.

Comparative Examples 5 and 6 are samples of the rare earth sintered magnet 1 prepared in the form of (Nd, Sm)—Fe—B in accordance with the production method according to the second embodiment using Nd, Sm, Fe, and FeB as raw materials. The evaluation of the magnetic properties of these samples in accordance with the method described above shows that the residual magnetic flux density is "poor", the coercive force is "poor", the temperature coefficient of residual magnetic flux density is "poor", and the temperature property evaluation of coercive force is "poor". This result indicates that the addition of only Sm to Nd—Fe—B does not contribute to improvement of the magnetic properties.

Examples 1 to 5 are samples of the rare earth sintered magnet 1 prepared in the form of (Nd, La, Sm)—Fe—B in accordance with the production method according to the second embodiment using Nd, La, Sm, Fe, and FeB as raw materials. The evaluation of the magnetic properties of these samples in accordance with the method described above shows that the residual magnetic flux density is "good", the coercive force is "good", the temperature coefficient of residual magnetic flux density is "good", and the temperature property evaluation of coercive force is "good".

The samples of Examples 1 to 5 are the rare earth sintered magnets 1 including: the main phase 10 satisfying general formula (Nd, La, Sm)—Fe—B and made of crystal grains based on $R_2Fe_{14}B$ crystal structures; and the crystalline subphase 20 based on an oxide phase represented by (Nd, La, Sm)—O. As described above, in the rare earth sintered magnets 1 of Examples 1 to 5, Sm is dispersed in the main phase 10 and the subphase 20 with a difference in concentration between the main phase 10 and the subphase 20, and the concentration of Sm is higher in the subphase 20 than in the main phase 10. As a result, these rare earth sintered magnets 1 can maintain magnetic properties at room temperature equivalent to those of Nd—Fe—B-based sintered magnets as well as preventing magnetic properties from degrading with temperature rise, despite the use of inexpensive rare earth elements as a substitute for Nd and Dy that are expensive and have a high procurement risk due to high distribution unevenness.

The configurations described in the above-mentioned embodiments indicate examples. The embodiments can be combined with another well-known technique and with each other, and some of the configurations can be omitted or changed in a range not departing from the gist.

REFERENCE SIGNS LIST

1 rare earth sintered magnet; 10 main phase; 11 core portion; 12 shell portion; 20 subphase; 31 crucible; 32 molten alloy; 33 tundish; 34 single roll; 35 solidified alloy; 36 tray container; 37 rare earth magnet alloy; 100 rotor; 101 rotor core; 102 magnet insertion hole; 120 rotary machine; 130 stator; 131 teeth; 132 windings.

The invention claimed is:

1. A rare earth sintered magnet comprising:

a main phase satisfying general formula (Nd, La, Sm)—Fe—B and including a crystal grain based on an $R_2Fe_{14}B$ crystal structure; and a crystalline subphase based on an oxide phase represented by (Nd, La, Sm)—O, wherein a part of Nd in the crystalline subphase is replaced by La and Sm such that a concentration at % of Sm in the crystalline subphase is higher than a concentration at % of Sm in the main phase, wherein $1 < Y_2/Y < X_2/X_1$ is satisfied, where $X_1$ represents the concentration at % of La contained in the main phase, $X_2$ represents the concentration at % of La contained in the subphase, $Y_1$ represents the concentration at % of Sm contained in the main phase, and $Y_2$ represents the concentration at % of Sm contained in the subphase.

2. The rare earth sintered magnet according to claim 1, wherein La is segregated in the subphase.

3. The rare earth sintered magnet according to claim 2, wherein La segregated in the subphase coats at least a part of a surface of the main phase.

4. The rare earth sintered magnet according to claim 1, wherein the main phase includes a core portion and a shell portion provided on an outer periphery of the core portion, and the shell portion has a higher concentration of Nd than the core portion.

5. A rotor comprising:

a rotor core; and the rare earth sintered magnet according to claim 1 provided in the rotor core.

6. A rotary machine comprising:

the rotor according to claim 5; and an annular stator facing the rotor and including, on an inner surface on a side where the rotor is placed, teeth protruding toward the rotor and windings provided on the teeth.

7. A method for producing a rare earth sintered magnet, the rare earth sintered magnet according to claim 1, the method comprising:

pulverizing a rare earth magnet alloy satisfying (Nd, La, Sm)—Fe—B;

preparing a molded body by molding powder of the rare earth magnet alloy;

preparing a sintered body by holding the molded body at a sintering temperature in a range of 600° C. to 1300° C. for a period of time in a range of 0.1 hours to 10 hours; and aging the sintered body.

8. The method for producing a rare earth sintered magnet according to claim 7, wherein aging the sintered body comprises holding the sintered body at a temperature equal to or lower than the sintering temperature within a range of 0.1 hours to 20 hours.

9. A rotor comprising:

a rotor core; and the rare earth sintered magnet according to claim 7 provided in the rotor core.

10. A rotary machine comprising:

the rotor according to claim 9; and an annular stator facing the rotor and including, on an inner surface on a side where the rotor is placed, teeth protruding toward the rotor and windings provided on the teeth.

* * * * *